United States Patent
Vigna et al.

(10) Patent No.: US 6,483,671 B2
(45) Date of Patent: Nov. 19, 2002

(54) MICROINTEGRATED STRUCTURE WITH PROTECTION AGAINST CONTAMINATING PARTICLES

(75) Inventors: Benedetto Vigna, Pietrapertosa (IT); Simone Sassolini, Sansepolcro (IT); Francesco Ratti, Alessandria (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 91 days.

(21) Appl. No.: 09/775,871

(22) Filed: Feb. 1, 2001

(65) Prior Publication Data

US 2001/0036683 A1 Nov. 1, 2001

(30) Foreign Application Priority Data

Feb. 2, 2000 (EP) .............................. 00830076

(51) Int. Cl.⁷ .............................. G11B 5/54; H02N 1/00
(52) U.S. Cl. .................................... 360/294.5; 310/309
(58) Field of Search ........................ 360/294.5; 310/309

(56) References Cited

U.S. PATENT DOCUMENTS

| | | | |
|---|---|---|---|
| 5,454,146 A | 10/1995 | Yagi et al. | 29/25.35 |
| 5,793,571 A | 8/1998 | Jurgenson et al. | 360/104 |
| 5,998,906 A | 12/1999 | Jerman et al. | 310/309 |

FOREIGN PATENT DOCUMENTS

| EP | 0913921 A1 | 5/1999 |
|---|---|---|
| EP | 0955629 A1 | 11/1999 |

OTHER PUBLICATIONS

Mee et al., "Only Clean Drive are Good Drives," *Data Storage*, Sep., 1997, pp. 77–78, and 80.

LaCroix et al., "Removable Storage Battles Old Enemy: Contamination," *Data Storage*, Aug., 1998, pp. 37–38, 40 and 44.

Zhang et al., "Lost Data: How a Little Dirt Can Do a lot of Damage," Data StorageI, Mar., 1999, pp15–16, 18 and 20.

*Primary Examiner*—George J. Letscher
(74) *Attorney, Agent, or Firm*—Lisa K. Jorgenson; David V. Carlson; Seed IP Law Group PLLC

(57) ABSTRACT

The microstructure, of semiconductor material, includes a micromotor and an encapsulation structure. The micromotor is externally delimited by a first and a second faces, opposed to one another, and by a side delimitation trench. The encapsulation structure surrounds the micromotor and has a bottom portion facing the second face of the micromotor, and an outer lateral portion facing the side delimitation trench. An outer separation trench extends through the bottom portion of the encapsulation structure, separates a mobile region from the external side portion, and defines, together with the side delimitation trench, a labyrinthic path for contaminating particles. A sealing ring extends on the bottom portion of the encapsulation structure around an inner separation trench separating the mobile region from a fixed central region and closes a gap between the bottom portion and a mobile component connected to the mobile region of the encapsulation structure.

25 Claims, 11 Drawing Sheets

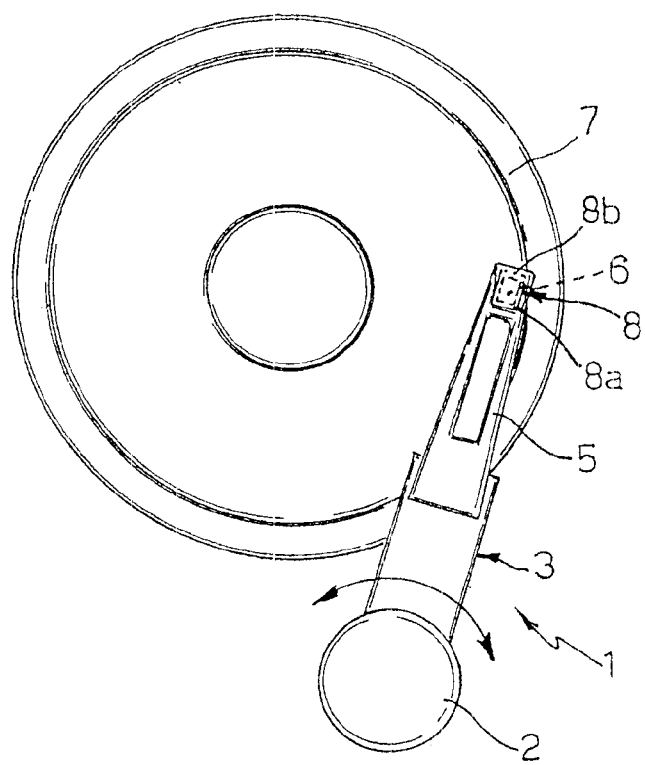
Fig. 1
(Prior Art)
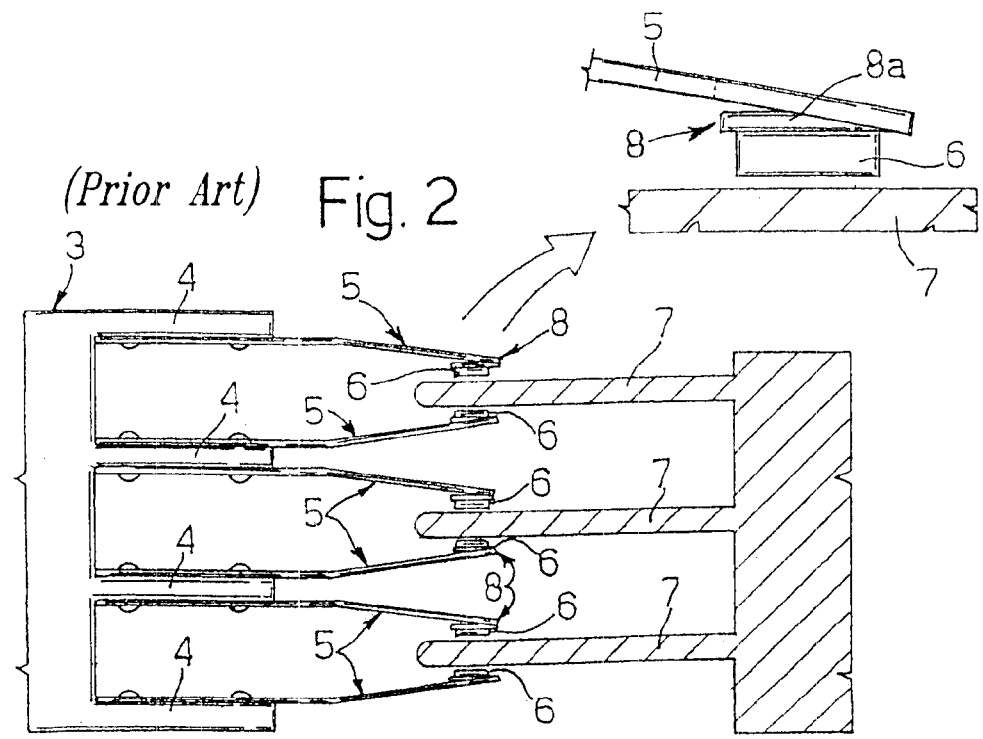
(Prior Art) Fig. 2

MICROINTEGRATED STRUCTURE WITH PROTECTION AGAINST CONTAMINATING PARTICLES

TECHNICAL FIELD

The present invention regards a process for manufacturing a microintegrated structure protected against contaminating particles, and the thereby obtained microintegrated structure. In particular, the invention may be advantageously applied to a microactuator fixed to an integrated device including the microactuator control circuitry and to a head in a hard-disk read/write unit with double micrometric actuation.

BACKGROUND OF THE INVENTION

As is known, hard disks are the most widely used data-storage medium; consequently, they are produced in very large volumes, and the maximum data-storage density increases from one year to the next. Hard disks are read and written by actuator devices, the general structure of which is shown in FIGS. 1 and 2 and is described hereinafter.

In particular, FIG. 1 shows a known actuator device 1 of the rotary type comprising a motor 2 (also called "voice coil motor") fixed to a support body, generally called "E-block" because of its E-like shape in side view (see FIG. 2). The support body 3 has a plurality of arms 4, each of which carries a suspension 5 including a cantilevered lamina. At its end not fixed to the support body 3, each suspension 5 carries a R/W transducer 6 for reading/writing, arranged (in an operative condition) facing a surface of a hard disk 7 so as to perform roll and pitch movements and to follow the surface of the hard disk 7. To this end, the R/W transducer 6 (also referred to as slider) is fixed to a joint, called gimbal or flexure 8, generally formed from the suspension 5 and comprising, for example, a rectangular plate 8a cut on three and a half sides starting from the lamina of the suspension 5, and having a portion 8b connected to the suspension 5 and allowing flexure of the plate 8a under the weight of the slider 6 (see FIG. 3).

In order to increase the data storage density, it has already been proposed to use a double actuation stage, with a first, rougher actuation stage including the motor 2 moving the assembly formed by the support body 3, the suspension 5 and the RIW slider 6 through the hard disk 7 during a coarse search for the track, and a second actuation stage performing a finer control of the position of the slider 6 during tracking. According to a known solution, the second actuation stage comprises a microactuator 10 arranged between the gimbal 8 and the slider 6, as may be seen in FIG. 3, which shows, in exploded view, the end of the suspension 5, the gimbal 8, the slider 6, and the microactuator 10, in this case, of the rotary type. The microactuator 10 is controlled by a signal supplied by control electronics on the basis of a tracking error.

The microactuator 10 is formed by fixed parts and suspended mobile parts. In particular, the latter, when assembling the R/W transducer on the microactuator and forming the connections with the control circuitry, may be displaced and/or may collapse. In addition, stresses may arise in the structure of the microactuator and cause the structure to become fragile.

In order to maintain final assembly processes similar to those used before the introduction of a double actuation stage, and at the same time prevent displacement and collapse, protection systems for the microactuator, in particular encapsulation structures, have been proposed. Since these systems must maintain the necessary mobility of the mobile parts with respect to the fixed parts, they have separation trenches. These trenches may represent privileged channels for entry of contaminating particles.

In particular, contaminating particles are usually of micrometric and submicrometric dimensions and are drawn into the hard-disk driver by the air circulating by virtue of the disk rotation and the rotor movement. The areas that are most subject to contamination are the high-voltage areas, in particular the fixed and mobile arms, which are separated by gaps with average dimensions of 2 $\mu$m.

These contaminating particles, as explained, for example, in the article by LiHong Zhang and Ramesh Koka, "Lost data: How a little dirt can do a lot of damage", Data Storage, March 1999, can cause irreparable damage to the hard disk or in any case prevent proper operation of the driver.

SUMMARY OF THE INVENTION

According to the present invention, a process for manufacturing a microintegrated structure and the thereby obtained microintegrated structure are provided. The microintegrated structure, of semiconductor material, includes a micromotor and an encapsulation structure. The micromotor is externally delimited by a first and a second faces, opposed to one another, and by a side delimitation trench. The encapsulation structure surrounds the micromotor and has a bottom portion facing the second face of the micromotor, and an outer lateral portion facing the side delimitation trench. An outer separation trench extends through the bottom portion of the encapsulation structure, separates a mobile region from the external side portion, and defines, together with the side delimitation trench, a labyrinthic path for contaminating particles. A sealing ring extends on the bottom portion of the encapsulation structure around an inner separation trench separating the mobile region from a fixed central region and closes a gap between the bottom portion and a mobile component connected to the mobile region of the encapsulation structure.

BRIEF DESCRIPTION OF THE DRAWINGS

For a clear understanding of the present invention, a preferred embodiment is now described, simply as a non-limiting example, with reference to the attached drawings, wherein:

FIG. 1 is a top view of a hard disk actuator of known type;

FIG. 2 is an enlarged side view of some parts of the actuator of FIG. 1;

DETAILED DESCRIPTION OF THE INVENTION

Figure 3:
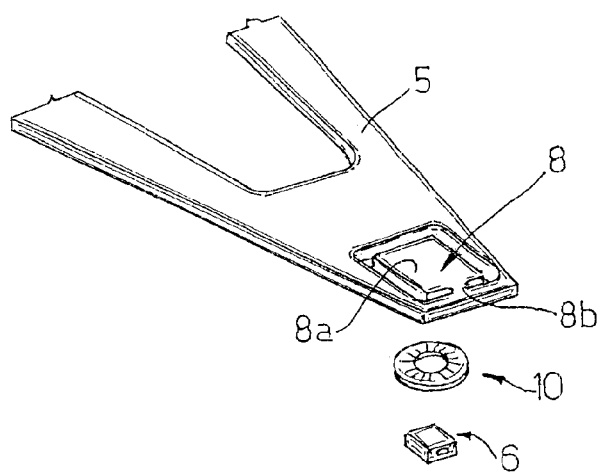
FIG. 3 is an exploded view of the micrometric actuation unit in an actuator device equipped with double actuation stage.

In the following description, reference will be made to the process for assembling a wafer integrating encapsulated-type microactuators on a wafer containing circuits for controlling the microactuator and signal-preamplification circuits, as well as for assembling the dice, obtained after cutting, on respective sliders and suspensions 5. In practice, with reference to FIG. 3, and as will be explained more clearly hereinbelow, the die containing a microactuator-controlling circuit and a signal-preamplification circuit is arranged between the microactuator 10 and the flexure 8.

Figure 4:
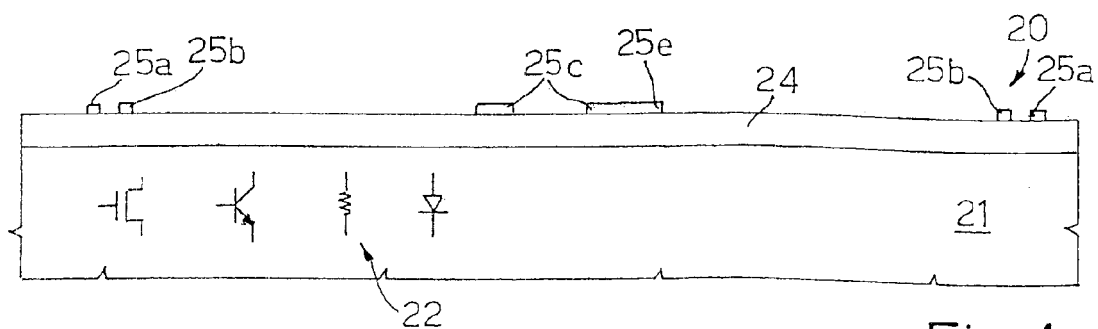
FIGS. 4 and 5 show cross-sections through two starting wafers used in the process according to the invention.
Figure 11:
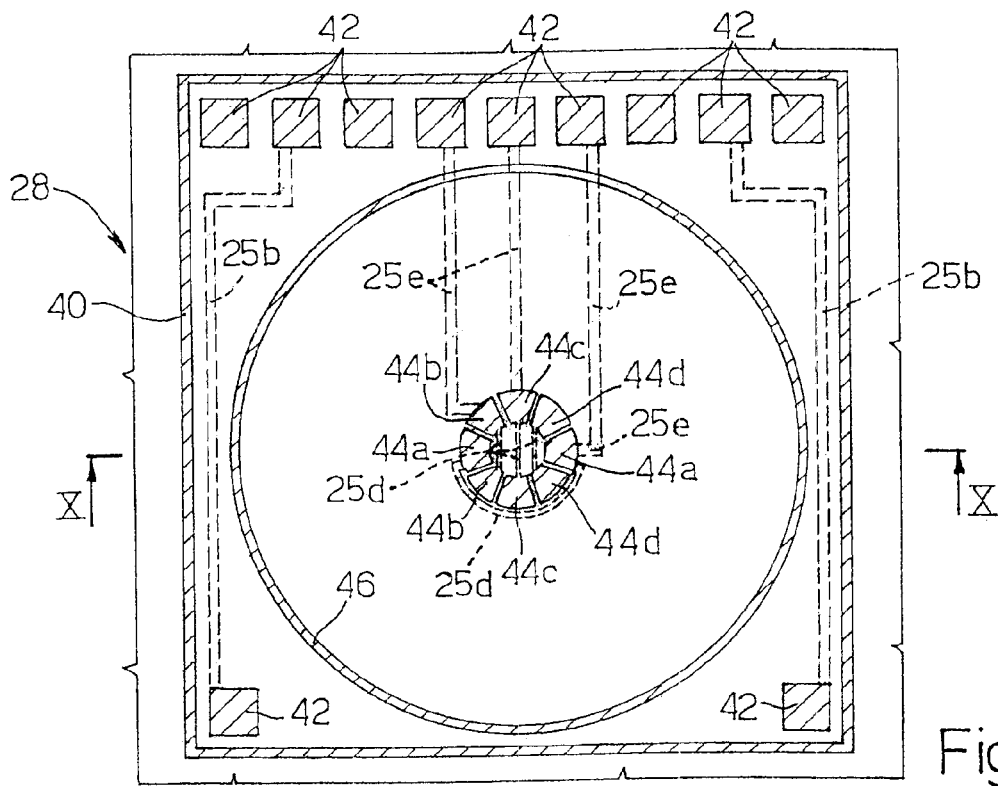
FIG. 11 shows a top view of the wafer of FIG. 10, in the same scale as FIG. 6.
Figure 18:
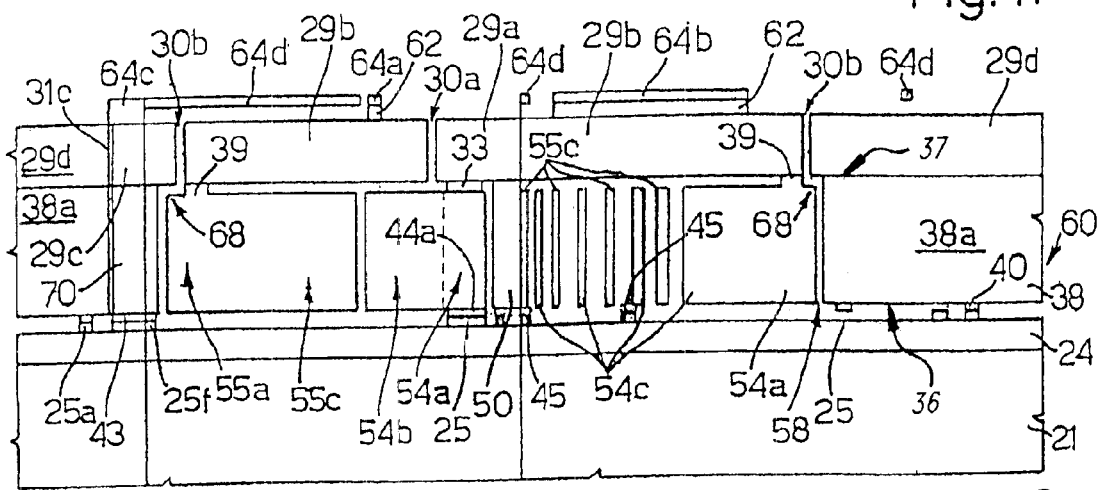
FIG. 18 shows a cross-section of the composite wafer in a manufacture step subsequent to FIG. 17, taken along cross-section line XVIII–XVIII of FIG. 19.

For this purpose (FIG. 4), in a first wafer 20 comprising a body 21 of monocrystalline silicon having a thickness of, for example, 600–700 $\mu$m, the circuits for controlling the microactuators and the circuits for signal preamplification 22 are formed, wherein these circuits are represented by electrical symbols of MOS and bipolar active components and passive components, using known microintegration techniques. The circuits 22 are of a standard type, and consequently they are not represented in detail. On top of the body 21, after completion of the electronic devices, an isolation layer 24, for example BPSG is formed; this layer is opened to form the connections of the circuits 22 with the microactuators 10 and the sliders 6, and, on top of the isolation layer 24 metal regions 25a–25e are formed—only some of which may be seen in FIG. 4, while others are indicated by a dashed line in FIG. 11, as will be described hereinafter—for example of palladium or gold, for electrical connection and bonding, using standard techniques of deposition and photolithographic definition of metal material. In particular, in this step there are formed: a bottom frame region 25a (the complete shape of which coincides with that of the region designated by 40 in FIG. 11); bottom pads (only one of which, designated by 25f, may be seen in FIG. 18); first electric connection lines 25b between the bottom pads; eight bottom conductive sectors 25c (the shape of which coincides with that of the top conductive sectors 44 of FIG. 11); second electric connection lines 25d (FIG. 11) which connect the bottom conductive sectors 25c two by two; and third interconnection lines 25e between the bottom conductive sectors 25c and certain bottom pads 25f (FIGS. 11 and 18).

Figure 5:
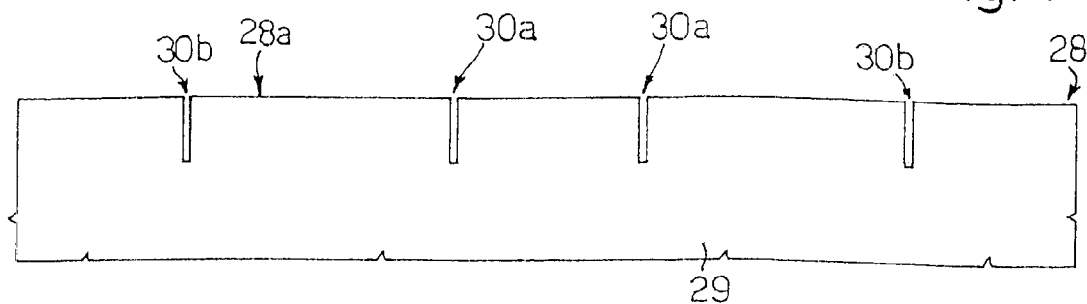

With reference to FIG. 5, a second wafer 28 is moreover formed. The second wafer 28 comprises a substrate 29 of monocrystalline silicon having a thickness of, for example, 600–700 $\mu$m. The second wafer 28 is designed to house a plurality of adjacent microactuators 10, and FIG. 5 shows a portion of a single microactuator 10.

Figure 6:
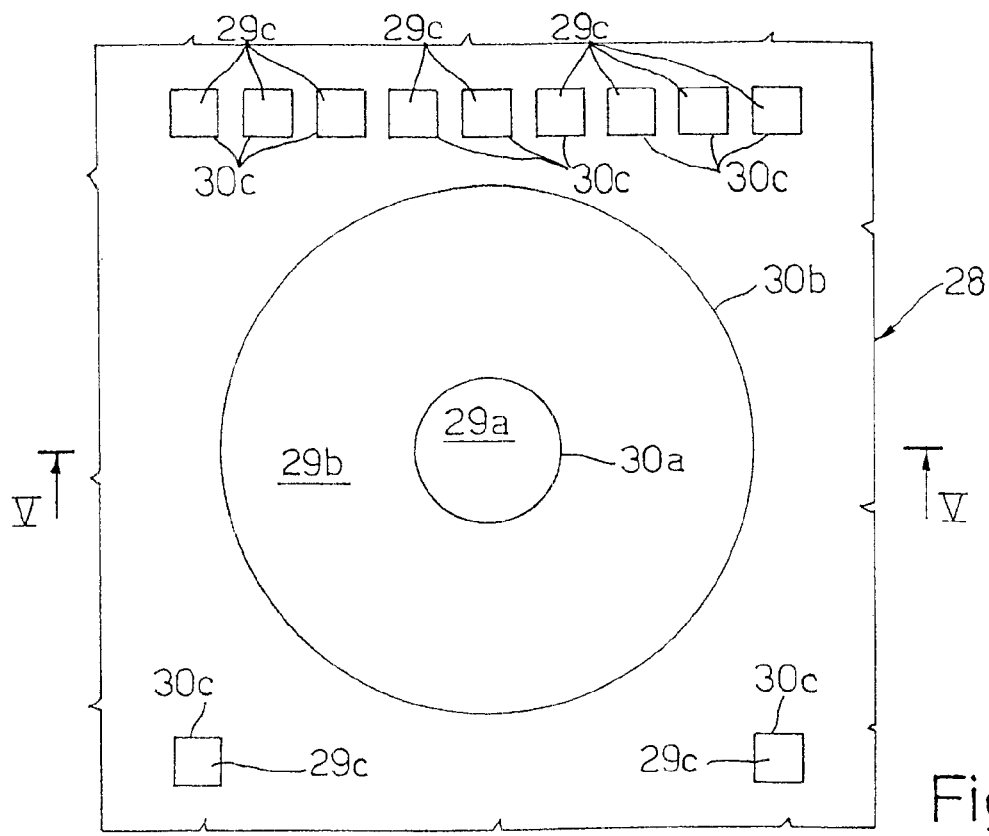
FIG. 6 shows a top view of the wafer of FIG. 5, at a slightly reduced scale.

The second wafer 28 is etched so as to form a first trench 30a, a second trench 30b, and a plurality of isolation trenches 30c having a width of approximately 1.5–2 $\mu$m and a depth of, for instance, 10 $\mu$m, the shape of which may be seen in FIG. 6. In detail, as is shown in FIGS. 5 and 6, the first trench 30a has the shape of a circumference with a first diameter and externally delimits a central supporting region 29a extending next to a surface 28a of the substrate 29. The second trench 30b has the shape of a circumference with a second diameter greater than the first diameter and is concentric with the first trench 30a so as to delimit, laterally, together with the first trench 30a, an annular supporting region 29b arranged next to the surface 28a of the substrate 29. The isolation trenches 30c, not visible in FIG. 5 and represented each only by a line in FIG. 6, have a square, or in general polygonal, shape, are arranged outside the second trench 30b, and delimit respective portions of the substrate 29 designed to form through electric connection regions 29c, also adjacent to the surface 28a. In particular, the isolation trenches 30c are arranged externally with respect to the second trench 30b.

The first and second trench 30a, 30b have the purpose of mechanically separating movable portions and fixed portions of the substrate 29, as will be explained more clearly later on.

Figure 7:
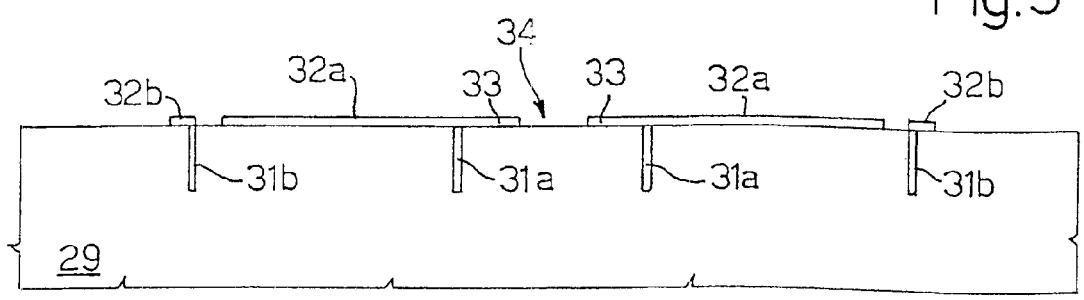
FIG. 7 shows a cross-section of the wafer of FIG. 5, in a subsequent manufacture step.
Figure 8:
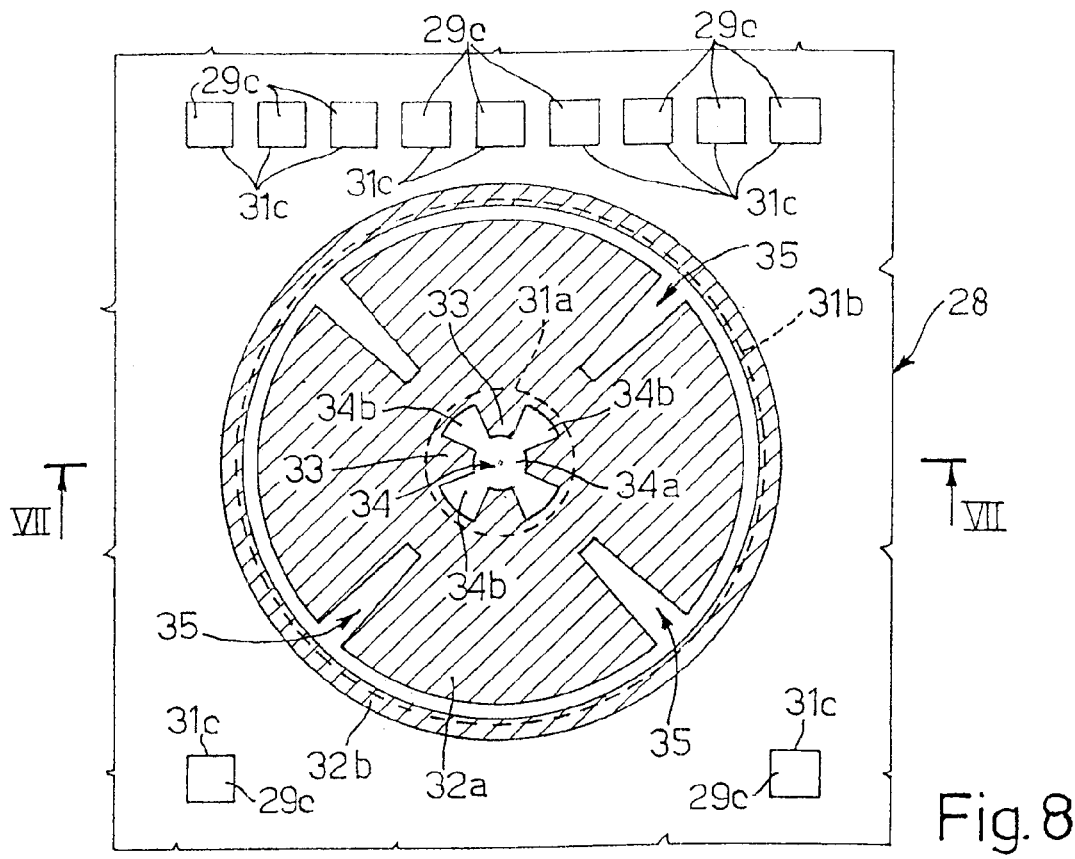
FIG. 8 shows a top view of the wafer of FIG. 7, in the same scale as FIG. 6.

Subsequently (FIG. 7), a first sacrificial layer (for example of silicon dioxide) is deposited for a thickness of approximately 1.5 $\mu$m; the sacrificial layer fills the trenches 30a, 30b, 30c, is then removed from the surface 28a of the substrate 29, and forms a first immobilization region 31a (in the first trench 30a), a second immobilization region 31b (in the second trench 30b), and deep electric isolation regions 31c (in the isolation trenches 30c), the deep isolation regions 31c being visible only in FIG. 8. Next, on the substrate 29 a second sacrificial layer (for example of silicon dioxide) having a thickness of, for example, of 2 $\mu$m is deposited and defined; the second sacrificial layer forms an anchor defining region 32a and a labyrinth region 32b, the shape whereof may be seen in the top view of FIG. 8. The external area of the labyrinth region 32b remains free from oxide areas to reduce the mechanical stress induced by the oxide.

In detail, the anchor defining region 32a has a generally annular shape, delimited internally by a central opening 34 and having radial notches 35. The central opening 34 comprises a central area 34a, which is circular, and of four expansions or "fins" 34b extending radially outwards starting from the central area 34a and arranged at 90°. The fins 34a delimit between each other portions of the anchor defining region 32a, hereinafter referred to as stator insulating regions 33, which have the function of anchoring and electrically insulating a stator of the microactuator 10, as will be explained in greater detail hereinafter. The radial notches 35 extend from the outer circumference of the anchor defining region 32a towards the fins 34b and define, as the fins 34b, areas of the substrate 29 where a rotor of the microactuator 10 is to be anchored, as will be clarified hereinafter. As an alternative, the portions of the anchor defining region 32a between the notches 35 may not be continuous, but reproduce the shape of the arms of the micromotor, as explained below.

The labyrinth region 32b has an annular shape and surrounds at a distance the anchor defining region 32a. The labyrinth region 32b has an inner diameter equal to or smaller than the second immobilization region 31b, and an outer diameter greater than the outer diameter of the second immobilization region 31b, as may be clearly seen in FIG. 7.

Figure 9:
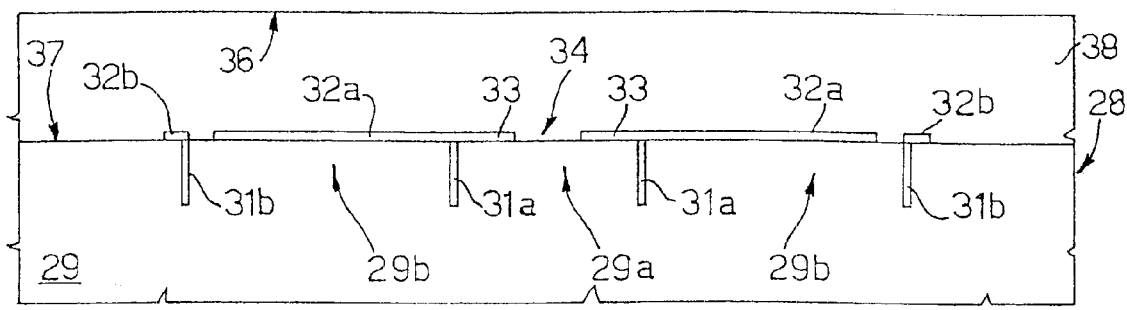
FIGS. 9 and 10 show cross-sections of the wafer of FIG. 7 in a subsequent manufacture step.

Subsequently (FIG. 9), a germ polycrystalline silicon layer is deposited (for a thickness of approximately 300–500 $\mu$m), and then a polycrystalline epitaxial layer 38 is grown, for a thickness of approximately 30 $\mu$m. The epitaxial layer 38 grows directly in contact with the substrate 29, in an area corresponding to the opening 34, the notches 35, between the anchor defining region 32a and the labyrinth region 32b, as well as outside the labyrinth region 32b itself, furthermore, it grows on top of the anchor defining region 32a and labyrinth region 32b. The epitaxial layer 38 thus has a first face 36, which is free, and a second face 37, which is facing the substrate 29 and is opposite to the first face 36.

Next, a polishing treatment is carried out, using the CMP technique, to reduce the roughness of the epitaxial layer 38.

Figure 10:
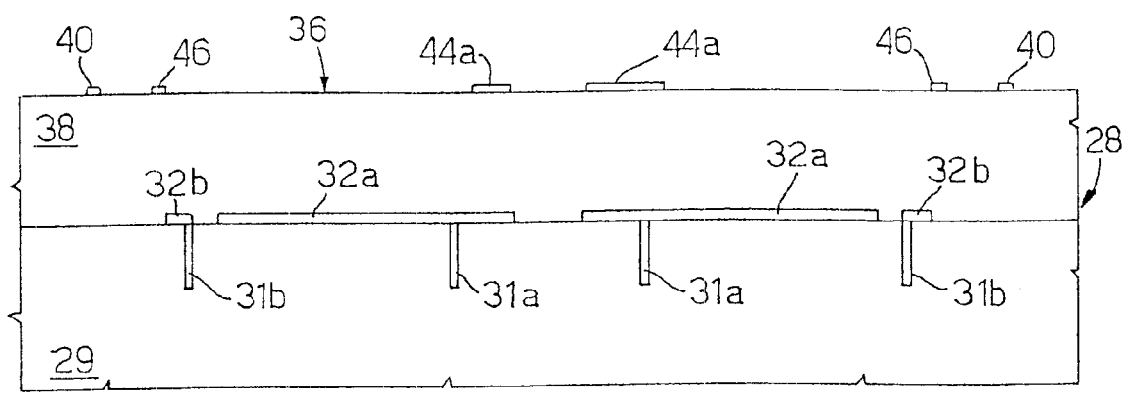

Subsequently (FIGS. 10 and 11), on the first face 36 of the epitaxial layer 38 an electrical connection and bonding material layer, for example palladium, is deposited and defined so as to form: an upper frame region 40, surrounding, in top view (FIG. 11), the area where the microactuator is to be formed and, as has already been said, having the same shape as the bottom frame region 25a; first top pads 42 which are vertically aligned with respect to electric connection regions 29c and may be superimposed on first bottom pads 25f (FIG. 18); four pairs of top conductive sectors 44a, 44b, 44c, 44d, which may be superimposed on the bottom conductive sectors 25c and are vertically aligned with the fins 34b and with the stator insulating regions 33 (namely, the pairs of top conductive sectors 44a and 44c are aligned with the stator insulating regions 33, and the pairs of top conductive sectors 44b and 44d are aligned with the fins 34b); and finally, a ring-shaped region 46, which has a greater diameter than the second immobilization region 31b and is arranged internally to the top frame region 40.

Figure 12A:
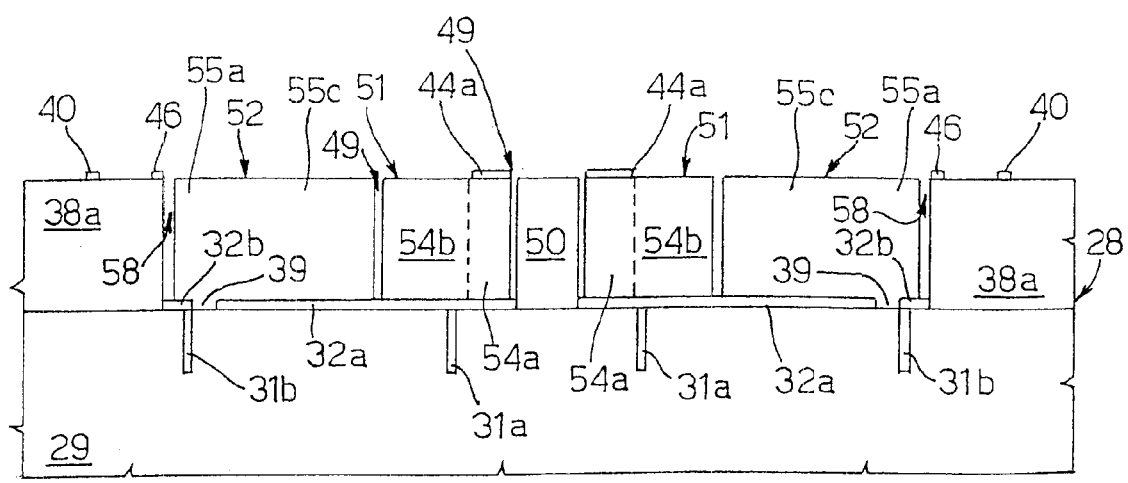
FIG. 12a shows a cross-section of the wafer of FIG. 10, in a subsequent manufacture step, taken along line A—A of FIG. 13.
Figure 12B:
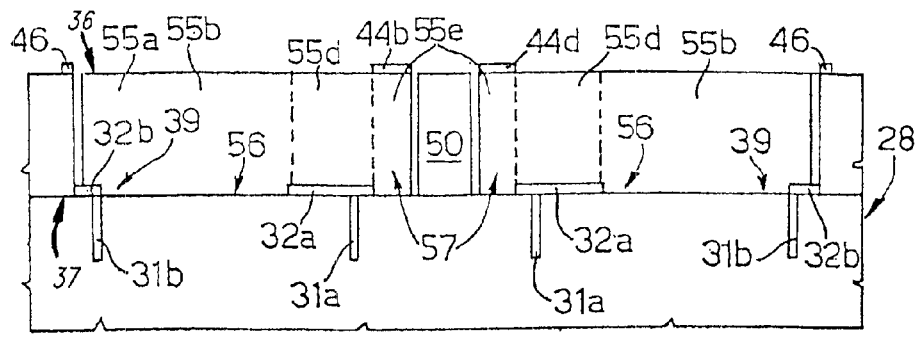
FIG. 12b shows a cross section of the wafer of FIG. 10, taken along line B—B of FIG. 13.

The epitaxial layer 38 is deep etched using the Reactive Ion Etching (RIE) technique, the etching stopping on the anchor defining region 32a and on the labyrinth region 32b. In this phase, as is shown in the sections of FIGS. 12a and 12b (the latter figure being taken at an angle of 45° with respect to the former figure) and in the (simplified) top view of FIG. 13, third trenches 49 are formed that delimit and separate a cylindrical region 50, a stator 51, and a rotor 52 from one another, and a fourth trench 58 which laterally separates the rotor 52 from an outer portion 38a of the epitaxial layer 38. In addition, third through contact regions 70 are formed which are aligned with the through electric connection region 29c.

In particular, the cylindrical region 50 is concentric with and electrically connected to the central supporting region 29a.

Figure 13:
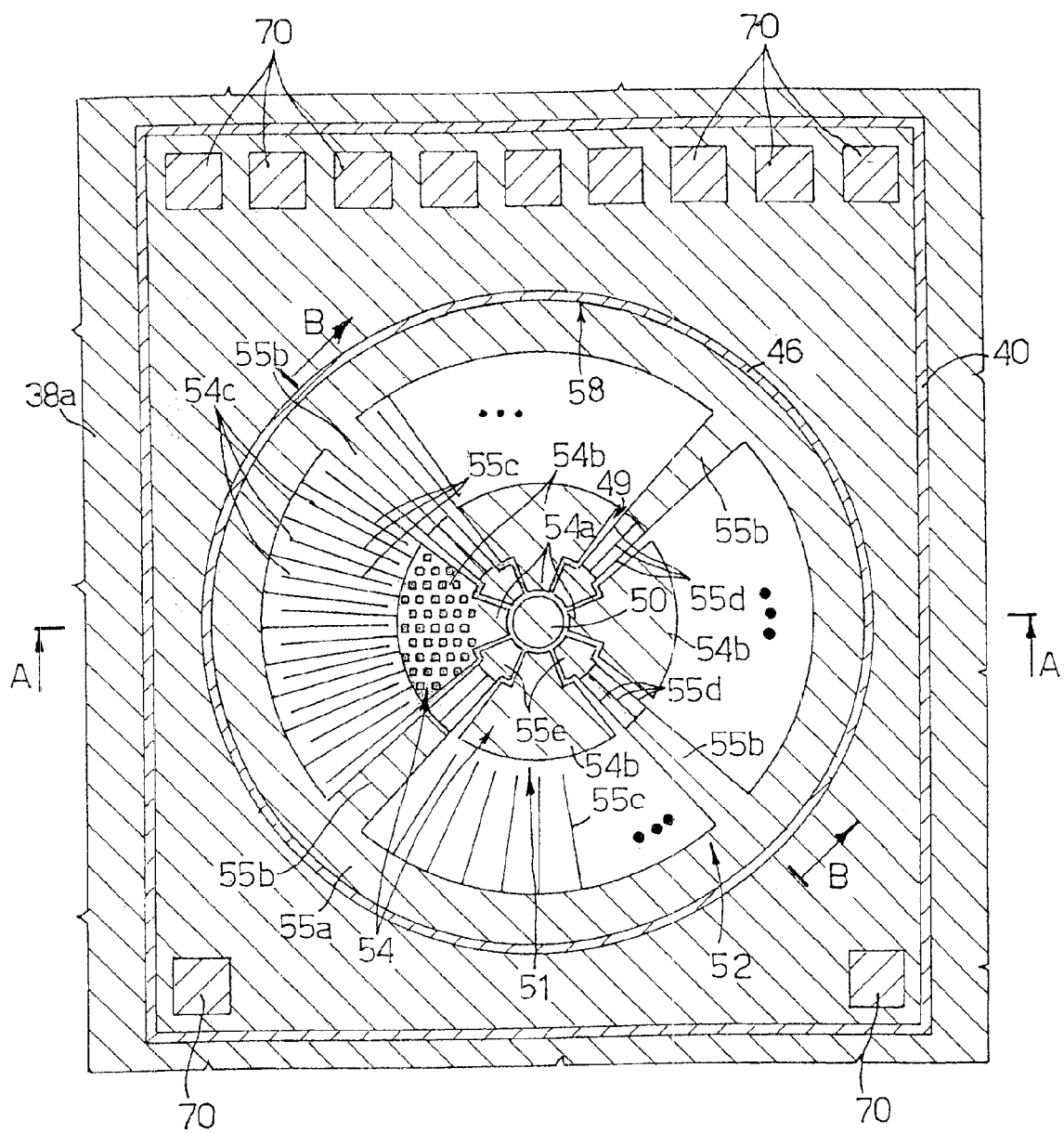
FIG. 13 shows a top view of the wafer of FIGS. 12a and 12b.

The stator 51 comprises four stator regions 54, only one of which is shown completely and schematically in FIG. 13. Each stator region 54 is completely insulated from the substrate 29 by the anchor defining region 32a, and comprises a stator anchoring portion 54a, having a substantially trapezoidal shape and extending underneath one of the top conductive sectors 44a and 44c; an annular sector portion 54b, which is provided with holes and is contiguous with and radially external to the stator anchoring portion 54a; and a plurality of fixed arms 54c extending radially outwards from the annular sector portion is 54b.

The rotor 52 comprises an outer annular region 55a, having an external diameter slightly greater than the diameter of the second immobilization region 31b and separated from the external portion 38a of the epitaxial layer 38 by the fourth trench 58, which has a greater diameter and thus is not aligned to the second trench 30b; four supporting arms 55b, formed in areas corresponding to the notches 35, between pairs of adjacent stator regions 54; a plurality of movable arms 55c (FIG. 12a) extending radially inwards from the outer annular region 55a and alternated with the fixed arms 54c; spring elements 55d extending from the supporting arms 55b inwards between adjacent pairs of annular sector portions 55b; and four movable anchoring sectors 55e having a substantially trapezoidal shape, each of which extends between a pair of stator anchoring portions 54a, beneath the top conductive sectors 44b, 44d. The outer annular region 55a is in direct contact with the annular supporting regions 29b via first rotor anchoring portions 39. The supporting arms 55b are in contact with the annular supporting region 29b via second rotor anchoring portions 56 (FIG. 12b). The movable arms 55c can be formed directly on top of and in contact with the annular supporting region 29b, or else, as shown in the illustrated embodiment, may be separated from the annular supporting region 29b by portions of the anchor defining region 32a. The spring elements 55d are isolated with respect to the substrate 29 by the anchor defining region 32a (FIG. 12b), and the movable anchoring sectors 55e are in direct electrical contact with the central supporting region 29a through third rotor anchoring regions 57 formed in areas corresponding to the fins 34b (FIG. 8). In addition, the spring elements 55d have a thin cross-section if compared to the supporting arms 55b, so as to have the necessary elasticity during movement of the rotor 52. In particular, the spring elements 55d are rigid in the vertical direction (perpendicular to the microactuator plane) and are compliant to rotation.

Figure 14:
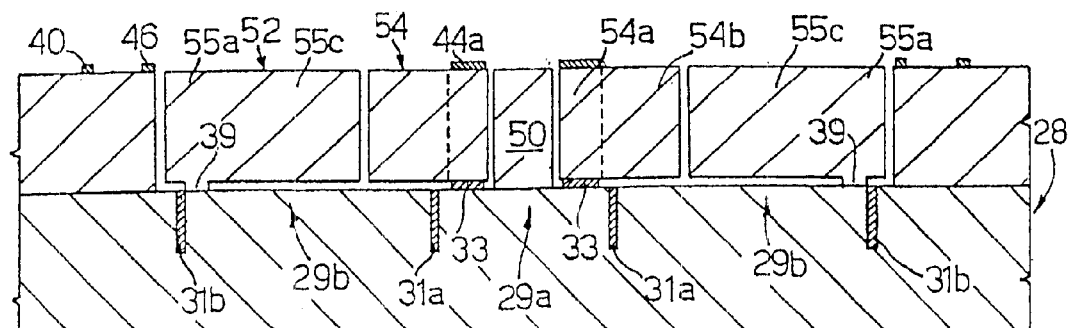
FIG. 14 shows a cross-section of the wafer of FIG. 12a, in a subsequent manufacture step.

Next (FIG. 14), the sacrificial oxide is etched using hydrofluoric-acid (HF) for a time sufficient for removing the labyrinth region 32b and the anchor defining region 32a beneath the fixed arms 54c, the movable arms 55c, and the annular sector portions 55b (thanks to the presence of holes in the latter), with the exception of the stator insulating regions 33. Consequently, the stator regions 54 remain anchored to the central supporting region 29a of the substrate 29 only at the stator insulating regions 33, and the rotor 52 remains anchored to the annular supporting region 29b of the substrate 29 at the first rotor anchoring portions 39 and the second rotor anchoring portions 56, and to the central supporting region 29a (through the spring elements 55d), at the third rotor anchoring portions 57.

Figure 15:
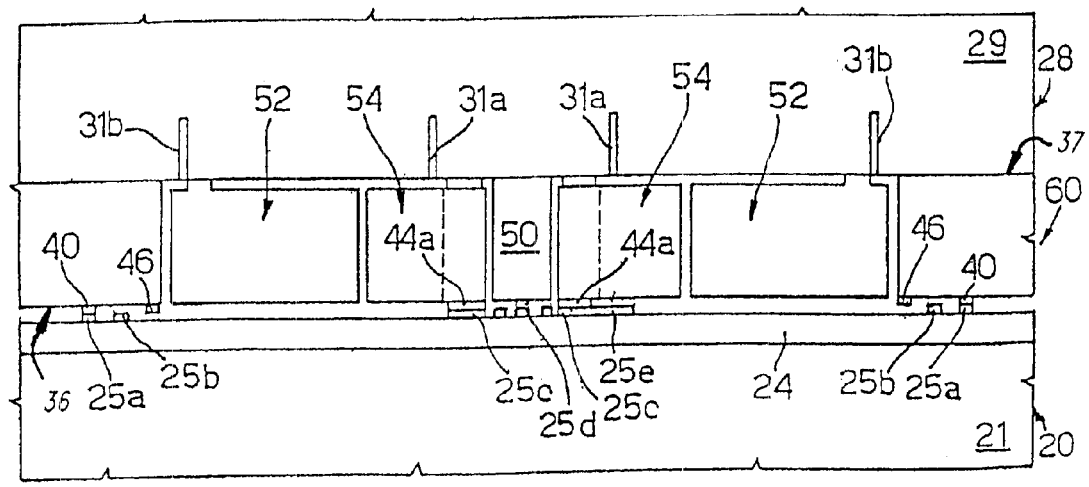
FIG. 15 shows a cross-section of the wafer of FIG. 14, after bonding to the wafer of FIG. 4.

Subsequently (FIG. 15), the second wafer 28 is turned upside down, aligned and welded to the first wafer 20 (wherein the microactuator-control and signal-preamplification circuits 22 are formed). In this phase, all the metal connection lines present on the first wafer 20 are exploited. In particular, the bottom frame region 25a are welded to the top frame region 40; the first bottom pads 25f 25a are welded to the top pads 42; and the bottom conductive sectors 25c 25a are welded to the top conductive sectors 44a–44d. A double wafer 60 is thus obtained.

Figure 16:
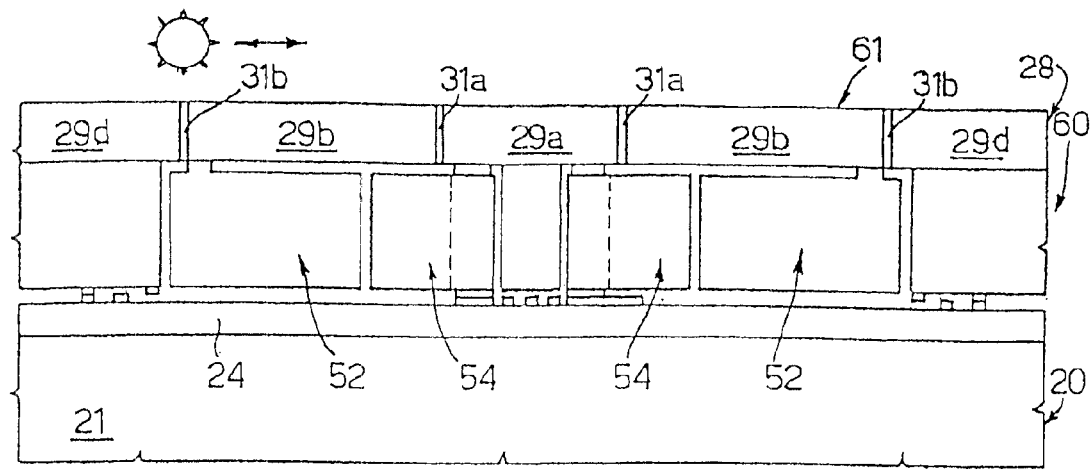
FIGS. 16 and 17 show cross-sections of the composite wafer of FIG. 15, in subsequent manufacture steps.

The second wafer 28 is then lapped (lapping phase—FIG. 16) until a final depth is obtained equal to the immobilization regions 31a, 31b (approximately 10 μm). Consequently, the second wafer 28 now has a free surface 61 where the immobilization regions 31a, 31b end. Furthermore, the central supporting region 29a, annular supporting region 29b and through electric connection regions 29c (the latter not being visible in FIG. 16) are now isolated from each other and from the outer portion 29d of the second wafer 28.

Figure 17:
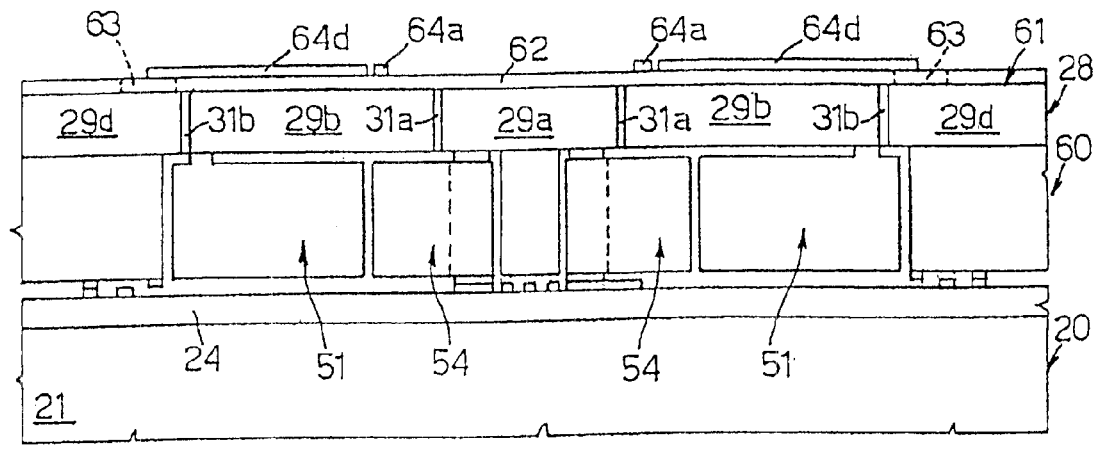

Subsequently (FIG. 17), a silicon-dioxide layer 62 with a thickness of approximately 2–3 μm is deposited on the surface 61. Vias 63 are formed through the silicon-oxide layer 62 aligned with the through electric connection regions 29c, as shown by dashed lines in FIG. 17. Using a resist mask (not shown), metal contact regions with a thickness of approximately 5 μm are grown galvanically (see FIG. 19), for example made of nickel (approximately 4 μm) coated with gold (for a thickness of approximately 1 μm). In detail, the following regions are formed: an annular metal region 64a extending on the annular supporting region 29b; four head connection regions 64b arranged at 90° to each other, externally to the annular metal region 64a and separate from each other; second contact pads 64c aligned vertically with the first top pads 42 (as may be noted from a comparison between FIGS. 19 and 11); and four electric connection lines 64d connecting the head connection regions 64d to as many second contact pads 64c. The second contact pads 64c extend also in the vias 63, thus guaranteeing electrical contact with the through electric connection regions 29c, as is shown only in part in FIG. 18.

Figure 19:
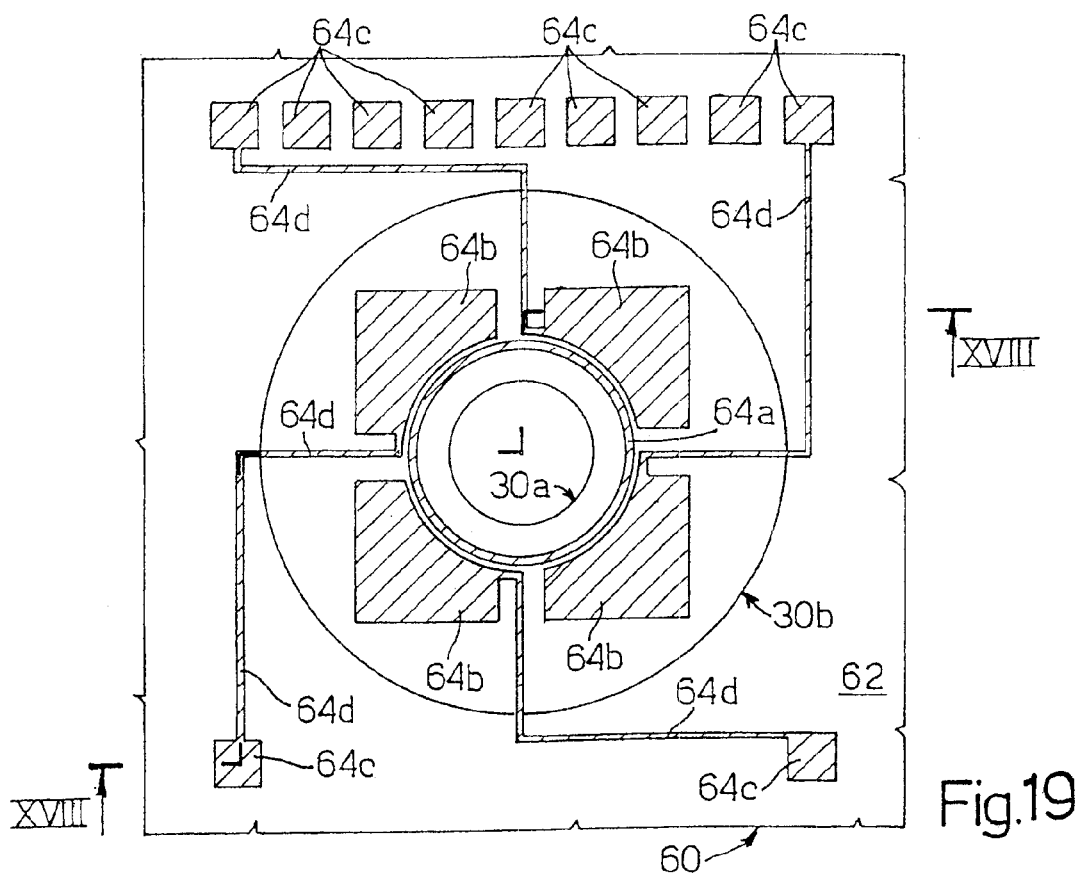
FIG. 19 shows a top view of the composite wafer of FIG. 18, in the same scale as FIG. 6.

The silicon-dioxide layer 62 is then etched without a mask and removed everywhere, except where it is shielded by the annular metal region 64a and by the four head-connection regions 64b. By appropriately selecting the width of the electric connection lines 64d and the etching time, the silicon-dioxide layer 62 is not, instead, shielded by the electric connection lines 64d (which thus remain free). In this phase, also the oxide present in the immobilization regions 31a, 31b is etched, so freeing the first trench 30a and the second trench 30b. The structure shown in FIG. 18 is thus obtained, in which, for a more complete representation of the three-dimensional structure of the double wafer 60, the section line is not straight but is as shown in FIG. 19.

In particular, FIG. 18 on the left shows, aligned with each other: a first bottom pad 25f, a first top pad 43, a second through connection region 70 formed in the outer portion 38a of the epitaxial layer 38, a through electric connection region 29c formed in the substrate 29, and a second contact pad 64c a portion whereof is formed where previously a via 63 was present. FIG. 18, on the right, shows the portion of the silicon-dioxide layer 62 remaining underneath a head-connection region 64b, fixed arms 54c and movable arms 55c. Furthermore, FIG. 18 shows the labyrinth structure comprising the second trench 30b and the fourth trench 58, mutually misaligned and connected together by a labyrinth path 68, where the labyrinth region 32b has been removed.

Figure 20:
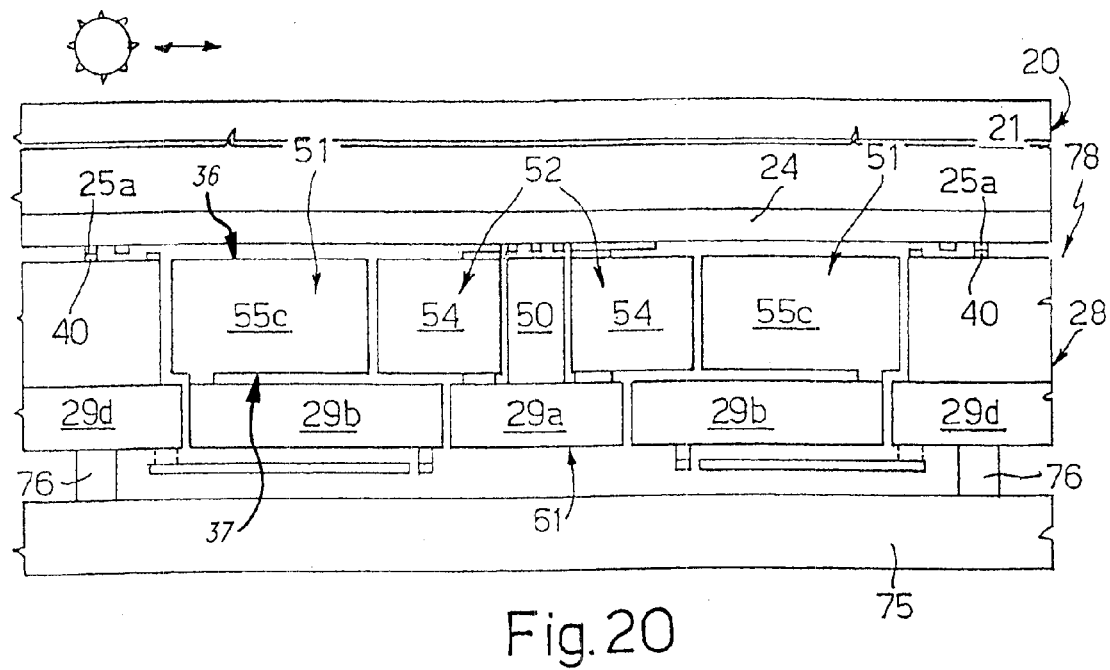
FIG. 20 shows a cross-section of the wafer of FIG. 17, after bonding to a third wafer.

Next (FIG. 20), the double wafer 60 is glued to a third wafer 75 with the free surface 61 (where the contact metal regions 64a–64d are formed) facing the third wafer 75; in this way, a composite wafer 78 is obtained. The third wafer 75 has a service function and is made, for example, of glass. For gluing, adhesive rings 76 are formed on the face of the third wafer 75 facing the double wafer 60. The adhesive rings 76 form closed lines, each surrounding an area of the second wafer 28 where a respective microactuator is formed, and are of a material enabling subsequent separation of the third wafer 75 from the double wafer 60. For example, an indium or lead-tin layer may be deposited by sputtering or screen printing and then defined; alternatively, if the third wafer 75 has protruding portions, just the gluing material may be deposited.

In this way, the microactuator 10 is completely isolated from the outside world, since it is enclosed between the first wafer 20, the third wafer 75, the frame regions 25a, 40, and the adhesive rings 76.

The first wafer 20 is then lapped until it has a thickness of approximately 80–100 μm.

Figure 21:
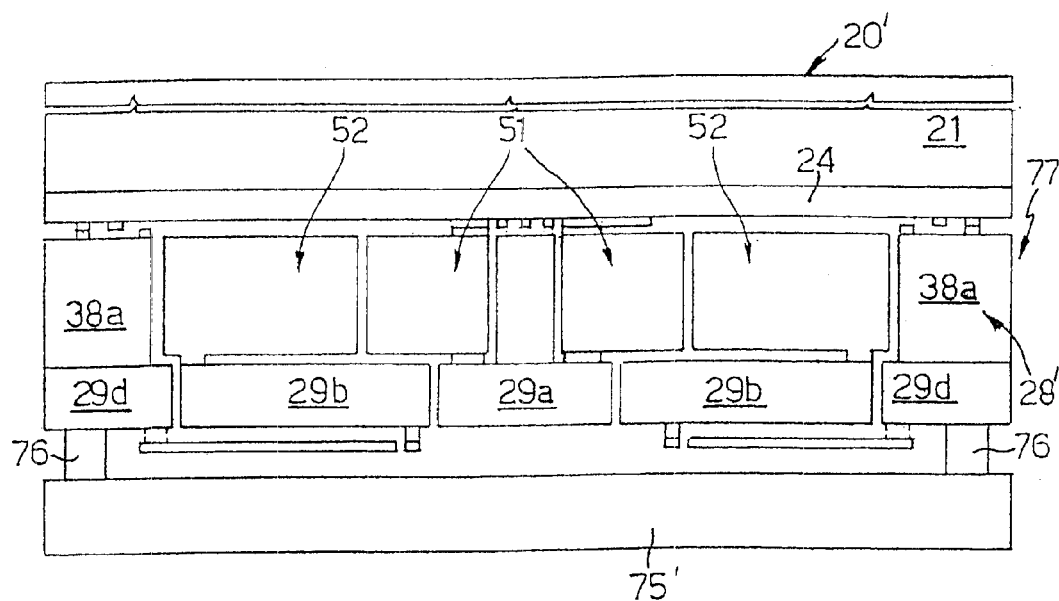
FIG. 21 shows a cross-section of a die obtained by cutting the composite wafer of FIG. 20.

Subsequently (FIG. 21), the composite wafer 78 is cut using ordinary cutting techniques. In this phase, the microactuator 10 is completely isolated and protected from the outside world, as explained above. Consequently, the suspended structures do not collapse due to the saw cooling water. A plurality of composite dice 77 is then obtained, each including a first die 20' and a second die 28' and being connected to a respective protection chip 75'. In this way, the composite dice 77 can be transported easily and with reduced risk of breakage. Alternatively, it is possible to separate the protective chip 75' by heating the composite dice 77 at a low temperature (200–260° C.), without damaging the components, and to transport the individual composite dice 77 on a traditional support using stick foil.

Figure 22:
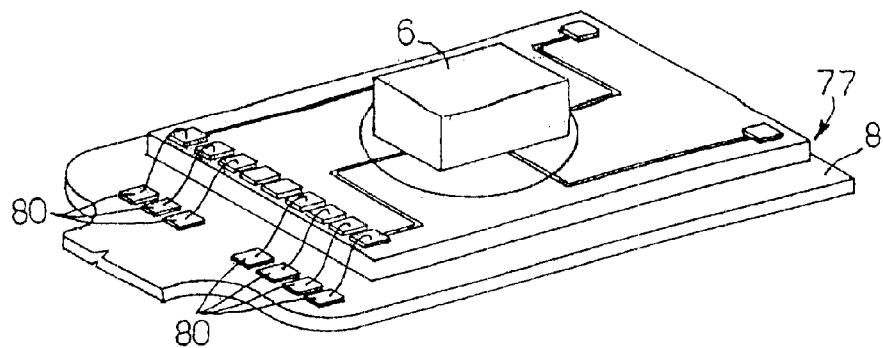
FIG. 22 shows a perspective view of the die of FIG. 21, after final assembly.

Finally (FIGS. 22 and 23), the final assembly steps are carried out, including gluing each composite die 77 on a respective gimbal 8, in a known way (and, in this step, the protection chip 75', if present, protects the composite die 77); removing the protection chip 75', if still present; gluing the slider 6 to the head-connection regions 64b; and wire-bonding the contact pads 64c to corresponding pads 80 provided on the gimbal 8.

Figure 23:
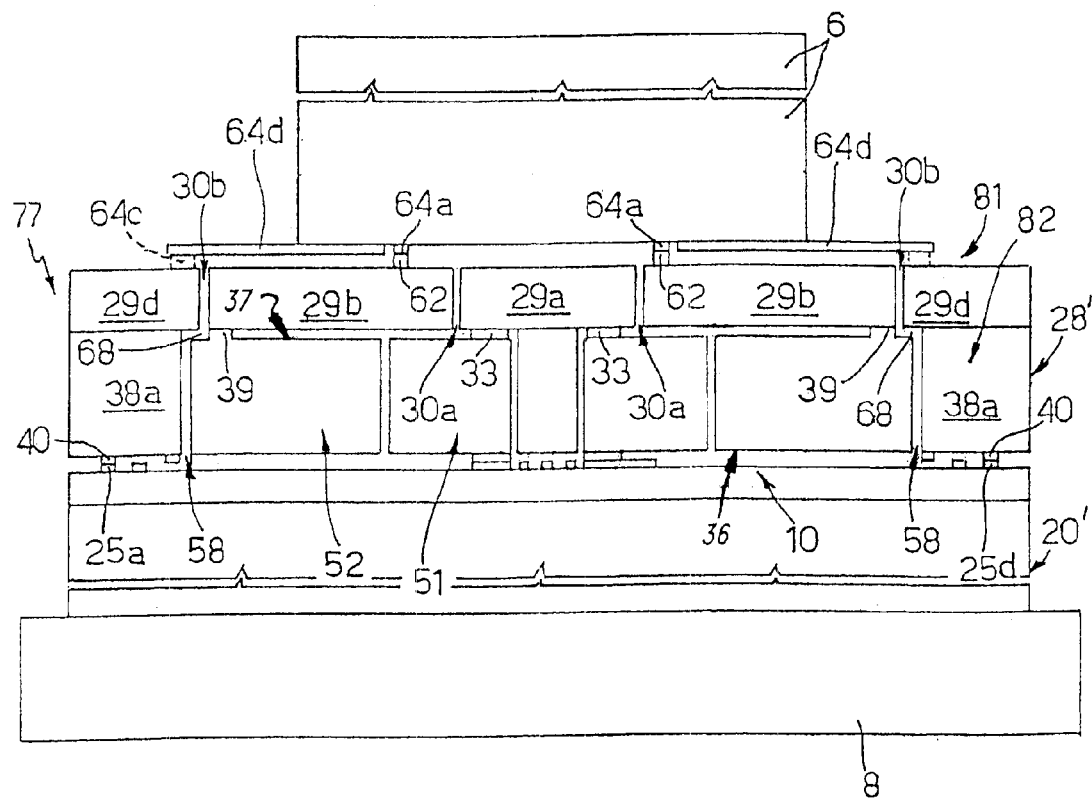
FIG. 23 shows a cross-section of the die of FIG. 22.

As may be seen in FIG. 23, the microactuator 10 has its rotor 52 and stator 51 formed in an operative portion of the second die 28' which is delimited by the first face 36 (arranged toward the first die 20' integrating the circuitry), by the second face 37, and by the fourth trench 58. The operative portion of the second die 28' is surrounded, on the second face 37 and on the side delimited by the fourth trench 58, by an encapsulation structure 81 formed by the central supporting region 29a, the annular supporting region 29b, and an external region 82 comprising part of the external portion 29d of the substrate 20 and part of the external portion 38a of the epitaxial layer 38. The stator 51 is supported by the central supporting region 29a through the stator insulating regions 33. The rotor 52 is supported both by the central supporting region 29a, through the third anchor portions 57, the movable anchoring sectors 55e and the spring elements 55d (in a manner not visible in the cross-section of FIG. 23), and by the annular supporting region 29b through the first rotor anchoring portions 39. In practice, the central supporting region 29a and the external region 82 of the encapsulation structure 81 are fixed, and the annular supporting region 29b is movable together with the rotor 52.

In the microactuator 10 of FIG. 23, the first trench 30a is isolated from the external environment by the metal annular region 64a which hermetically seals the gap between the slider 6 and the encapsulation structure 81, so preventing any external contamination both during fabrication and during operation of the hard-disk unit.

Any contamination through the second trench 30b is limited by the labyrinth conformation defined by the second trench 30b itself, by the labyrinth path 68 and by the fourth trench 58. In fact, any particles that may penetrate into the second trench 30b are forced to follow a tortuous path in which they can be entrapped before they reach the rotor 52. The labyrinth structure preferably has the following dimensions: the second trench 30b has a width of approximately 1.5 μm; the labyrinth path 68 has a width of approximately 50 μm and a thickness of approximately 2–4μm; and the fourth trench has a width of approximately 1.5μm.

The terms labyrinth, labyrinthian and the like are used in their broadest sense as referring to channels which have at least one sharp turn or bend therein. Such channels may, of course have multiple turns and bends, for example in one embodiment of the present invention a labyrinthian path may be in the form of a series of switchbacks with sharp turns. On the other hand, according to another embodiment of the invention only one or two turns are present in order to provide the labyrinthian path. For example, as shown in the FIGS. 18–25 of the present invention. The labyrinth path 68 includes two turns, a first turn at a sharp 90 degree angle and a second turn at another sharp 90 degree angle. Of course, other turns and combinations of turns could be used as well as different angles, besides 90 degrees in order to provide the labyrinthian path. According to the principles of the invention, there should be at least one bend or change in direction of the path, that would serve to block movement of a contaminating particle before it can interfere with free movement of the rotor.

Finally, the gimbal 8 is fixed to an arm 4 of the support body 3 in a per se known, not illustrated manner.

The advantages of the described process emerge clearly from the foregoing. In particular, it is emphasized that forming the microactuator 10 in a separate wafer, which is bonded upside down on the wafer accommodating the electronic components, allows the microactuator and the circuitry requiring an extreme lithographic process to be arranged closely, and the latter to be protected during assembly and cutting. In general, the described process enables assembling of any other micro-electromechanical actuation or sensing element that requires a lithographic process with different characteristics as the circuitry controlling and/or processing the signals supplied by the micro-electromechanical element, or when it is desirable to have a micro-electromechanical element formed in a separate wafer with respect to the electronic circuits that are connected to the micro-electromechanical element.

In addition, the microactuator 10 is protected both during fabrication, by the encapsulation structure 81, and during use, by the annular metal region 64a and the labyrinth structure formed by the second trench 30b, the fourth trench 58, and the labyrinth path 68, as explained previously.

Finally, it is clear that numerous variations and modifications may be made to the process and unit described and illustrated herein, all falling within the scope of the invention, as defined in the attached claims.

Figure 24:
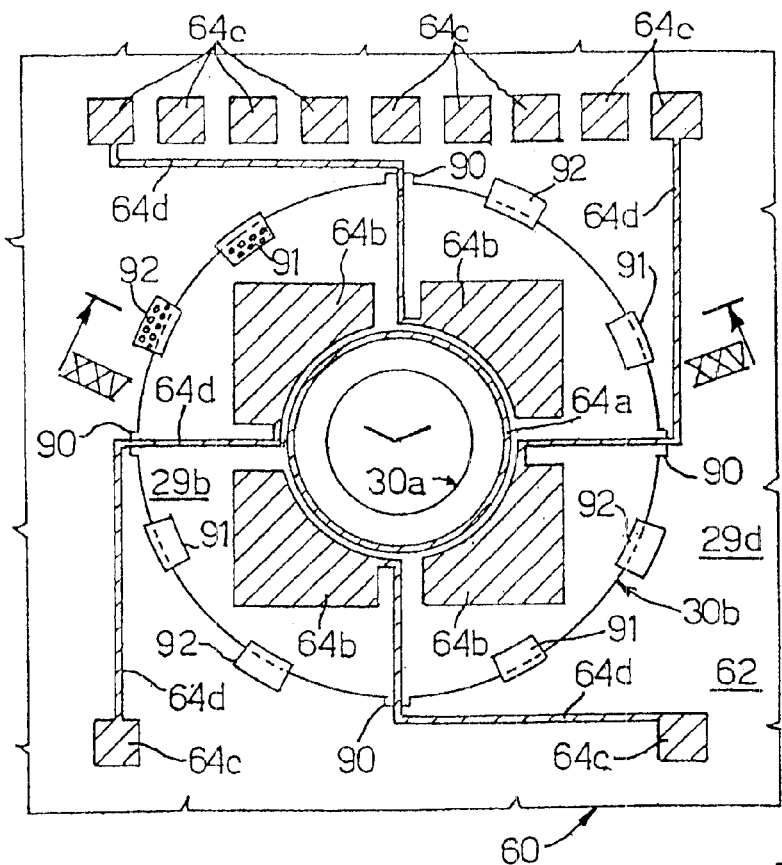
FIG. 24 shows a different embodiment of the microactuator in a top view similar to that of FIG. 19.
Figure 25:
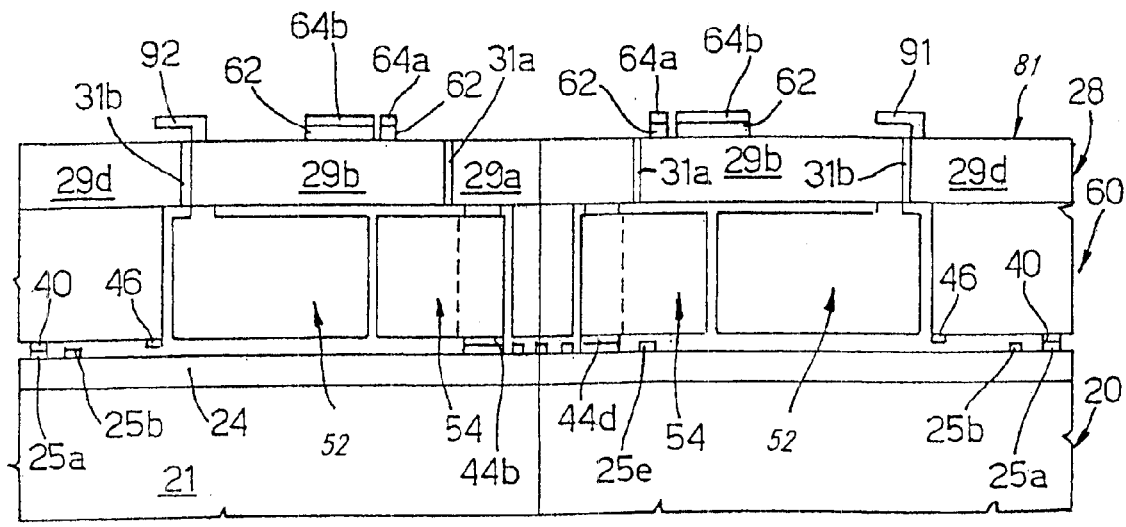
FIG. 25 shows a cross-section of the wafer of FIG. 24, taken along the cross-section line XXV–XXV.

For example, FIGS. 24 and 25 show a variation of the structure illustrated in FIGS. 18 and 19. In particular (see FIG. 24), the second trench 30b is not completely circular but is formed in such a way that the annular supporting region 29b has intrusions or teeth 90 extending in corresponding compartments of the outer portion 29d so as to form mechanical stops to the rotation of the outer portion 29d and possibly supply an end-of-travel signal.

In addition, stop elements 91, 92 are formed to limit the relative movements of the rotor 52 with respect to the fixed parts (stator 51, encapsulation structure 81), movements that are due to assembly operations or to inertial forces acting during operation of the microactuator 10. In detail, vertical stop elements 91, 92 are formed in the same way as the contact metal regions 64a–64d and are mutually interleaved. Specifically, the vertical stop elements 91 are anchored on the annular supporting region 29b and extend beyond the outer portion 29d; instead, the vertical stop elements 92 are anchored on the outer portion 29d and extend beyond the annular supporting region 29b. The portions of the vertical stop elements 91, 92 that extend in a cantilever way, respectively, above the outer portion 29d and above the annular supporting region 29b are preferably at least in part perforated to enable removal of the silicon-dioxide layer 62, as shown schematically only for a few of the vertical stop elements 91, 92.

By forming the stop elements 91, 92 with an unholed part protruding above the second trench 30b and adjacent to each other, a protective cage is obtained for the second trench 30b.

As an alternative to the drawings, the intrusions or teeth 90 and the vertical stop elements 92 may be arranged between the annular supporting region 29b and the cylindrical region 50.

Connection between the first and the second wafers 20, 28 may be formed also in a way different from what has been shown, For example, the connection and electric contact regions 25a–25e, 40, 44a–44d and the ring-shaped region 46 may be formed on only one of the two wafers, for example on the first wafer 20, using a double metal-level process.

Finally, the movable anchoring sectors 55e may be joined to the cylindrical region 50, instead of being separated by the third trench 49, so that the rotor 52 is anchored also to the cylindrical region 50.

What is claimed is:

1. A microstructure comprising a micromechanical element and a monolithic encapsulation structure of semiconductor material, said micromechanical element being formed in a semiconductor material body and being externally delimited by a first and a second face, opposed to each other, and by a side delimitation trench, and comprising a mobile part and a fixed part, characterized in that said encapsulation structure surrounds said micromechanical element, said encapsulation structure having a bottom portion facing said second face of said micromechanical element and an outer side portion facing said side delimitation trench, and in that said encapsulation structure has at least one outer separation trench extending through said bottom portion, said outer separation trench separating a mobile region of said encapsulation structure from said external side portion and defining, together with said side delimitation trench, a labyrinth path for contaminating particles.

2. The microstructure according to claim 1, wherein said side delimitation trench is laterally misaligned with respect to said outer separation trench and is connected to said outer separation trench by a labyrinthic cavity extending along said second face of said encapsulation structure.

3. The microstructure according to claim 2, wherein said encapsulation structure further has an inner separation trench traversing said bottom portion, said inner separation trench separating said mobile region of said encapsulation structure from a central region, and in that it further comprises:
   a sealing structure extending on said bottom portion of said encapsulation structure in a surrounding position with respect to said inner separation trench; and
   a mobile component connected to said mobile region of said encapsulation structure, said sealing structure being arranged between said mobile region of said encapsulation structure and said mobile component thereby said inner separation trench is isolated from outside by said sealing structure and by said mobile component.

4. The microstructure according to claim 3, wherein said sealing structure comprises an annular metal region and is aligned with metal contact regions arranged between said mobile region of said encapsulation structure and said mobile component, and with vertical stop elements cooperating with said mobile region.

5. The microstructure according to claim 1, further comprising:
an attach region arranged on said outer region of said encapsulation structure, laterally to said first face of said micromechanical element, said attach region surrounding said side delimitation trench; and
a die connected to said micromechanical element by said attach region and housing integrated electronic components, said attach region isolating said micromechanical element from outside.

6. The microstructure according to claim 5, wherein said attach region is of electrically conductive material and is aligned with electric connection regions.

7. The microstructure according to claim 1, wherein said micromechanical element is an actuator of rotary type comprising a rotor and a stator, said first face of said actuator being connected to a die housing a microactuator control circuit and a signal preamplification circuit, and said mobile region of said encapsulation structure being connected to a read/write transducer of a bard-disk drive unit.

8. The microstructure according to claim 7, wherein said die is connected to a supporting block for a hard-disk actuator device.

9. The microstructure according to claim 1, wherein a cage structure anchored to at least one of said mobile region and outer side portion and having portions protruding above said outer separation trench.

10. A process for manufacturing a microstructure comprising:
forming, in a semiconductor material body, a micromechanical element having mobile parts and fixed parts separated from each other, said micromechanical element being externally delimited by a first and a second faces, opposed to each other, and by a side delimitation trench;
forming a monolithic encapsulation structure of semiconductor material, which surrounds said micromechanical element, said encapsulation structure having a bottom portion facing said second face of said micromechanical element and an outer side portion facing said side delimitation trench; and
forming at least one outer separation trench extending through said bottom portion of said encapsulation structure, said outer separation trench separating a mobile region of said encapsulation structure from an outer side portion and defining, together with said side delimitation trench, a labyrinth path for contaminating particles.

11. The process according to claim 10, wherein said side delimitation trench is laterally misaligned with respect to said outer separation trench and in that it comprises the step of forming a labyrinthic cavity extending along said second face of said encapsulation structure between said side delimitation trench and said outer separation trench.

12. The process according to claim 11, wherein the step of forming an encapsulation structure comprises the steps of:
forming said outer separation trench in a semiconductor layer;
filling said outer separation trench with immobilization material;
forming a sacrificial region contiguous to said outer separation trench on top of said semiconductor layer;
growing a semiconductor layer on said semiconductor substrate;
forming said side delimitation trench in said semiconductor layer, said side delimitation trench being contiguous to said sacrificial region;
removing said sacrificial region to form said labyrinthic cavity; and
removing said immobilization material.

13. The process according to claim 12, further comprising the step of thinning said semiconductor substrate before removing said immobilization material.

14. The process according to claim 10, further comprising:
forming an inner separation trench extending through said bottom portion of said encapsulation structure, said inner separation trench separating said mobile region of said encapsulation structure from a central region;
forming a sealing structure on top of said bottom portion of said encapsulation structure in a surrounding position with respect to said inner separation trench; and
connecting a mobile component to said mobile region of said encapsulation structure, said sealing structure being arranged between said mobile region of said encapsulation structure and said mobile component thereby isolating said inner separation trench with respect to outside by said sealing structure and by said mobile component.

15. The process according to claim 14, wherein said sealing structure comprises an annular region of metal and is formed simultaneously with metal contact regions arranged between said mobile region of said encapsulation structure and said mobile component.

16. The process according to claim 15, further comprising forming, simultaneously with said metal contact regions, vertical stop regions to limit movement of said mobile parts with respect to said fixed parts.

17. The process according to claim 10, further comprising:
forming an attach region on an outer region of said encapsulation structure, laterally to said first face of said micromechanical element, said attach region surrounding said side delimitation trench; and
attaching said micromechanical element to a die housing integrated electronic components through said attach region, said attach region isolating said micromechanical element from outside.

18. The process according to claim 17, wherein said micromechanical element is an actuator of rotary type comprising a rotor and a stator, and further comprising the steps of:
attaching said first face of said actuator to a die housing a microactuator control circuit and a signal preamplification circuit;
and attaching said mobile region of said encapsulation structure to a read/write transducer of a hard-disk drive unit.

19. A microactuator for positioning a read/write transducer, comprising:
a rotor, whereon is attached said transducer;
a stator;
an encapsulation structure, comprising integrated circuitry for operating said microactuator, and enclosing said rotor and stator for protection from contaminating particles;

a separation trench, having a cylindrical gap between a fixed portion of said encapsulation structure and a mobile portion of said encapsulation structure, the cylindrical gap being shaped to impede entrance of contaminating particles into a space between said rotor and said stator.

20. The microactuator according to claim 19, wherein the mobile portion of said encapsulation structure is affixed between said rotor and said transducer.

21. The microactuator according to claim 20, wherein said rotor is laterally defined by a cylindrical delimitation trench, forming a separation between said rotor and said encapsulation structure.

22. The microactuator according to claim 21, wherein said separation trench and said delimitation trench are contiguous, having a common axis, and having dissimilar diameters.

23. The microactuator according to claim 22, wherein a bottom extreme of said separation trench is connected laterally to a top extreme of said delimitation trench by a cavity, and wherein said separation trench, said delimitation trench and said cavity comprise a path having one change in direction from the bottom to the top, for the protection of said microactuator from contaminating particles.

24. The microactuator according to claim 19 wherein the shape of the cylindrical gap to impede entrance of contaminated particles is a shape having at least two changes in direction from one end thereof to the other end thereof.

25. The microactuator according to claim 24 in which the shape of the cylindrical gap is a labyrinthian shape having a plurality of direction changes from one end thereof, to the other end thereof.

* * * * *